United States Patent
Gall et al.

(10) Patent No.: US 11,867,087 B2
(45) Date of Patent: Jan. 9, 2024

(54) COMPOSITE FAN BLADE ROOT (71) Applicant: Rolls-Royce plc, London (GB)

(72) Inventors: Christopher Gall, London (GB); Anthony Newnham, London (GB)

(73) Assignee: ROLLS-ROYCE PLC, London (GB)

( * ) Notice: Subject to any disclaimer, the term of this patent is extended or adjusted under 35 U.S.C. 154(b) by 422 days.

(21) Appl. No.: 17/056,862

(22) PCT Filed: May 21, 2019

(86) PCT No.: PCT/EP2019/063111
§ 371 (c)(1),
(2) Date: Nov. 19, 2020

(87) PCT Pub. No.: WO2019/228864
PCT Pub. Date: Dec. 5, 2019

(65) Prior Publication Data
US 2021/0301672 A1 Sep. 30, 2021

(30) Foreign Application Priority Data
May 31, 2018 (GB) ...................................... 1808939

(51) Int. Cl.
*B64C 11/04* (2006.01)
*F01D 5/30* (2006.01)
(Continued)

(52) U.S. Cl.
CPC ........... *F01D 5/3007* (2013.01); *F01D 5/282* (2013.01); *G01N 29/043* (2013.01); *G01N 29/07* (2013.01);
(Continued)

(58) Field of Classification Search
CPC ...... F01D 5/282; F01D 5/3007; F01D 5/3092; F05D 2300/6033
(Continued)

(56) References Cited

U.S. PATENT DOCUMENTS

| | | | |
|---|---|---|---|
| 4,343,593 A * | 8/1982 | Harris ..................... | F01D 5/282 416/241 A |
| 2004/0062655 A1* | 4/2004 | Potter ................... | F01D 5/3092 416/241 R |

(Continued)

FOREIGN PATENT DOCUMENTS

| | | |
|---|---|---|
| CN | 203479767 U | 3/2014 |
| CN | 104502449 A | 4/2015 |

(Continued)

OTHER PUBLICATIONS

Jul. 26, 2019—(WO) International Search Report & Written Opinion—App. No. PCT/EP2019/063111.
(Continued)

*Primary Examiner* — Long T Tran
*Assistant Examiner* — James J Kim
(74) *Attorney, Agent, or Firm* — Banner & Witcoff, Ltd.

(57) ABSTRACT

There is disclosed a composite fan blade root 100 comprising an outer region 110 comprising composite material and defining an outer inspection surface 120 of the component; an inner region 108 surrounded by the outer region 110; and an internal reflection boundary 102 embedded within the root 100 between the inner region and the outer region. The reflection boundary is configured to change a velocity of a signal emitted into the root from the inspection surface, whereby a signal emitted into the root from the inspection surface 120 may be reflected for detection.

17 Claims, 6 Drawing Sheets

(51) Int. Cl.
    *F01D 5/28*     (2006.01)
    *G01N 29/04*     (2006.01)
    *G01N 29/07*     (2006.01)

(52) U.S. Cl.
    CPC .... *F05D 2260/83* (2013.01); *G01N 2291/011* (2013.01); *G01N 2291/015* (2013.01); *G01N 2291/0231* (2013.01); *G01N 2291/044* (2013.01); *G01N 2291/101* (2013.01); *G01N 2291/2693* (2013.01)

(58) Field of Classification Search
    USPC ...................................................... 416/219 R
    See application file for complete search history.

(56) References Cited

U.S. PATENT DOCUMENTS

| | | | | |
|---|---|---|---|---|
| 2005/0084379 | A1* | 4/2005 | Schreiber | F01D 5/30 416/230 |
| 2008/0187441 | A1* | 8/2008 | Schreiber | F01D 5/282 416/229 R |
| 2010/0054937 | A1* | 3/2010 | Beckford | F01D 5/147 416/2 |
| 2012/0230829 | A1* | 9/2012 | Benkler | F01D 5/3007 416/219 R |
| 2016/0146021 | A1* | 5/2016 | Freeman | F01D 5/282 29/889.21 |
| 2016/0245100 | A1 | 8/2016 | Luczak | |

FOREIGN PATENT DOCUMENTS

| | | |
|---|---|---|
| EP | 3026216 A1 | 6/2016 |
| EP | 3139004 A1 | 3/2017 |
| JP | 2010-53868 A | 3/2010 |
| JP | 2013-60949 A | 4/2013 |

OTHER PUBLICATIONS

Nov. 9, 2018—(GB) Search Report—App. No. GB1808939.1.
Mar. 17, 2023—(JP) Office Action—App 2020-564365 (trans).

* cited by examiner

COMPOSITE FAN BLADE ROOT

CROSS-REFERENCE TO RELATED APPLICATIONS

This application is a U.S. National Stage application under 35 U.S.C. § 371 of International Application No. PCT/EP2019/063111, filed May 21, 2019, which claims the benefit of priority to United Kingdom Application No. GB 1808939.1, filed May 31, 2018, and the present application claims the benefit of the filing date of both of these prior applications, which are incorporated by reference in their entireties.

TECHNICAL FIELD

The invention relates to a composite fan blade root comprising an embedded pulse-reflecting boundary.

BACKGROUND

Non-destructive testing techniques have been used in the aerospace industry to test for defects and weaknesses in safety critical components.

One such example is ultrasonic testing in which an ultrasound signal (such as a pulse or other waveform) is emitted through the surface of a component so that it travels through the component and is reflected at defects or at an opposing surface of the component. Any reflected signals are detected and analysed to determine whether they relate to reflection from the opposing surface or the presence of defects.

BRIEF SUMMARY

According to an aspect, there is provided a composite fan blade root comprising: an outer region comprising composite material and defining an outer inspection surface of the component; and an internal reflection boundary embedded within the root, the internal reflection boundary being configured to change a velocity of a signal emitted into the root from the inspection surface so as to at least partially reflect the signal.

The composite material may be fibre reinforced composite material, such as carbon or glass fibre reinforced composite. The outer region may define two separate inspection surfaces. The two inspection surfaces may be separated by a base or radially-inner surface of the fan blade root.

The boundary may be formed by a discrete element embedded in the root. The boundary may not be formed by a defect such as a crack or air pocket in the composite root. Reflection of a signal at a boundary may be partial reflection so that the signal is transmitted through the boundary and a reflected signal is reflected at the boundary.

The boundary may define a continuous or discontinuous layer of material, or may be defined by an interface between regions of differing ply structure of material.

The material forming the boundary may have different acoustic properties from surrounding material in the root so as to change a velocity of a signal emitted into the root from the inspection surface. Regions of differing ply structure or material which define a reflection boundary at their interface may have different acoustic properties from each other so as to change a velocity of a signal emitted into the root from the inspection surface, so as to at least partially reflect the signal.

The root may further comprise an inner region surrounded by the outer region. The boundary may delimit the inner region from the outer region. The boundary may delimit the inner region from the outer region so that any signal emitted through the inspection surface and reaching the inner region passes through the boundary.

In other words, the boundary may delimit the inner region from the outer region so that any signal emission direction from the inspection surface (i.e. for emission of a signal from the inspection surface) which intersects the inner region passes through the boundary. The boundary may delimit (or separate) the outer region from the inner region along directions from the inspection surface towards the inner region, such that any signal emitted through the inspection surface and reaching the inner region passes through the boundary.

The boundary may be defined by an interface between the outer region and the inner region.

The outer region may comprise a carbon fibre composite material, for example. The inner region may comprise a glass fibre composite material, polymer or metal alloy, for example.

The inner and outer regions may comprise the same material. Alternatively, the outer region may comprise a first material and the inner region may comprise a different second material.

The ply structure of the outer region may differ from the ply structure of the inner region so that the boundary is formed by a change in the ply structure at an interface between the inner region and the outer region. Such a change may cause a change in local speed of sound between so as to cause reflection of a signal.

The boundary may generally be in the form of a layer of boundary material which differs from and is embedded within the composite material forming at least the outer region. The layer may be sheet like and optionally curved so as to be non-planar.

The curvature or profile of the layer may correspond to the curvature or profile of an associated inspection surface. The curvature or profile of the layer may correspond to the local curvature of an interface between plies of the composite material, which may differ from a curvature or profile of the associated inspection surface.

The boundary may be defined by a plurality of discrete portions of boundary material.

The discrete portions of boundary material may be spaced apart from one another so that for any point on the inspection surface a path to a closest discrete portion of boundary material is shorter than a path extending between two closest discrete portions of boundary material to an opposing surface of the fan blade root. Accordingly, even if the discrete portions of boundary material are spaced apart so as to permit a signal to reach an inner region of the root without passing through the boundary material (as the case may be), when the signal is emitted in a plurality of directions a reflected signal may still be reflected from one of the closest portions of boundary material towards the inspection surface.

Alternatively, adjacent portions of boundary material may be offset from one another in a direction normal to a local tangent plane of the layer, and may overlap one another (i.e. they may overlap one another within the layer).

The adjacent portions of boundary material may overlap one another within the layer to present a continuous signal-reflecting boundary to signals received along directions normal to the layer.

When the boundary delimits the outer region from an inner region as described above, the adjacent portions of boundary material may overlap one another within the layer to delimit the outer and inner regions along directions from the inspection surface towards the inner region.

Adjacent portions of boundary material may overlap one another within the layer along a lateral direction of the layer (i.e. corresponding to in-plane directions of a local tangent plane) and may be offset along a direction normal to the layer (i.e. normal to a local tangent plane of the layer). Adjacent portions of boundary material may overlap along two orthogonal lateral directions within the layer.

The boundary may be in the form of a layer of boundary material which is completely surrounded by the composite material. Completely surrounded is intended to mean that all sides of the layer and all edges of the layer are surrounded by the composite material. Accordingly, the layer may not extend to or through a surface of the fan blade root.

The composite fan blade root may comprise a base surface extending between the inspection surfaces. The boundary may form a layer which does not extend to the base surface. The boundary may extend to forward and/or aft axial surfaces of the fan blade root (i.e. those surfaces which are at either end of a chordwise extent of the fan blade root).

For each point on the inspection surface there may be a minimum reflection path length corresponding to either back wall reflection at an opposing surface of the fan blade root or boundary reflection at the boundary. The boundary may be positioned so that for points within a first region of the inspection surface the minimum reflection path length corresponds to back wall reflection; whereas for points within a second region of the inspection surface the minimum reflection path length corresponds to boundary reflection.

The first region may include a region adjacent a blade portion of the fan blade. The first region may include a region adjacent a base surface extending between opposing inspection surfaces of the fan blade root. The second region may be disposed between adjacent first regions. In particular, when viewed in axial cross-section, the inspection surface may have first regions adjacent respective edges of the inspection surface and a second region between the first regions.

The composite fan blade root may have a compressive stress region corresponding to compressive loading in use, and the internal reflection boundary may be disposed within the compressive stress region.

The composite fan blade root may further comprise a tensile stress region outside the compressive stress region. The tensile stress region may correspond to tensile loading in use.

A profile of the boundary may correspond to a profile of the inspection surface. The boundary may be embedded in the root at a substantially constant depth from the inspection surface. The depth corresponds to the distance between the boundary and the inspection surface along a direction normal to the inspection surface.

There may be a plurality of inspection surfaces. There may be a plurality of boundaries, each boundary associated with a respective inspection surface.

According to a second aspect, there is provided a composite fan blade comprising a composite fan blade root in accordance with the first aspect.

According to a third aspect, there is provided a gas turbine engine comprising a composite fan blade in accordance with the second aspect.

BRIEF DESCRIPTION OF THE DRAWINGS

Embodiments of the invention will now be described, by way of example, with reference to the accompanying drawings, in which.

DETAILED DESCRIPTION

Figure 1:
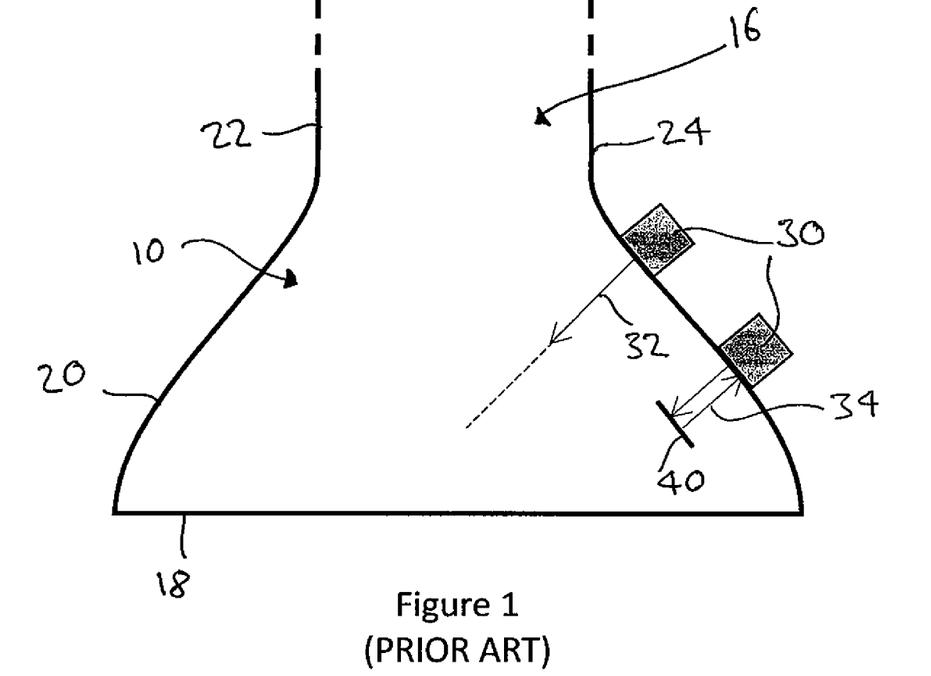
FIG. 1 schematically shows a cross section of a previously-considered fan blade root.

FIG. 1 shows an axial cross section of a previously-considered composite dovetail fan blade root 10 of a fan blade for a gas turbine engine (not shown). The cross-section shown is normal to the rotational axis of the gas turbine. The fan blade root 10 is configured to anchor the fan blade to a hub (not shown) of the gas turbine engine. The composite root 10 is integrally formed with a blade portion 16.

In this example, the root 10 has a substantially constant axial cross-section and tapers along a radially outward direction. The example root 10 has a radially inner base surface 18 opposite the blade portion 16 and two tapering side surfaces corresponding to the pressure and suction surfaces 22, 24 of the blade portion 16. The tapering side surfaces of the root 10 are referred to herein as inspection surfaces 20, since the disclosure relates to inspection of the root 10 through these surfaces. The inspection surfaces 20 of the root 10 each merge with the pressure surface 22 and the suction surface 24 respectively of the blade portion 16.

In use, the root 10 is slotted into the hub of a gas turbine engine so that the inspection surfaces 20 oppose a radially outer retaining surface of the hub. During rotation of the hub, the fan blade experiences a centrifugal force which is reacted by the retaining surface of the hub to hold the fan blade.

In a previously-considered testing procedure, testing equipment 30 comprising an ultrasound transmitter and receiver is disposed on an inspection surface 20 of the root 10 to detect the presence of significant defects in the composite root 10.

In a first example position on the inspection surface 20, the transmitter emits an ultrasound signal 32 which is transmitted through the root 10. By way of example, the signal is described in the examples herein as a pulse so that illustrations of emission and detection can be readily interpreted. However, it will be appreciated that the signal may take any suitable form (or waveform), and is not limited to comprising a pulse. The pulse travels through the root 10 until it encounters an internal feature which results in a change in the local speed of sound, such as a crack, pocket of air 40 or other defect.

In this example, there is no such defect in the path of the emitted pulse 32, and so the pulse 32 continues to travel through the root 10 until it encounters another surface of the root—in this example the base surface 18—which presents a change in the local speed of sound such that the pulse is at least partially reflected at the base surface 18. However, whilst travelling through the root 10, the example pulse 32 and its reflection is attenuated such that the reflected pulse is not detected by the equipment 30.

The attenuation is a function of the properties of the material and the frequency at which the signal is emitted. At lower frequencies, the attenuation may be less such that a pulse can be detected over longer paths, but the accuracy of detecting defects may be reduced. Therefore, there is a trade-off between the distance which the pulse can travel and the accuracy of detection of a defect.

With the testing equipment at a second example position on the inspection surface 20, there is a defect such as a crack 40 in the path of the pulse 32 as shown in FIG. 1. The pulse 32 is partially reflected at the crack 40 and partially transmitted through the crack 40. In this example, the attenuation along the reflected path length to the crack 40 is minimal and the reflected pulse 34 is detected at the receiver.

Therefore, the detection of a reflected pulse 34 indicates either reflection from an opposing surface of the root 10, or the presence of a crack 40 or other defect in the root 10. Operators of testing equipment monitor characteristics of a reflected pulse 34 to determine if it relates to the presence of a defect.

Figure 2:
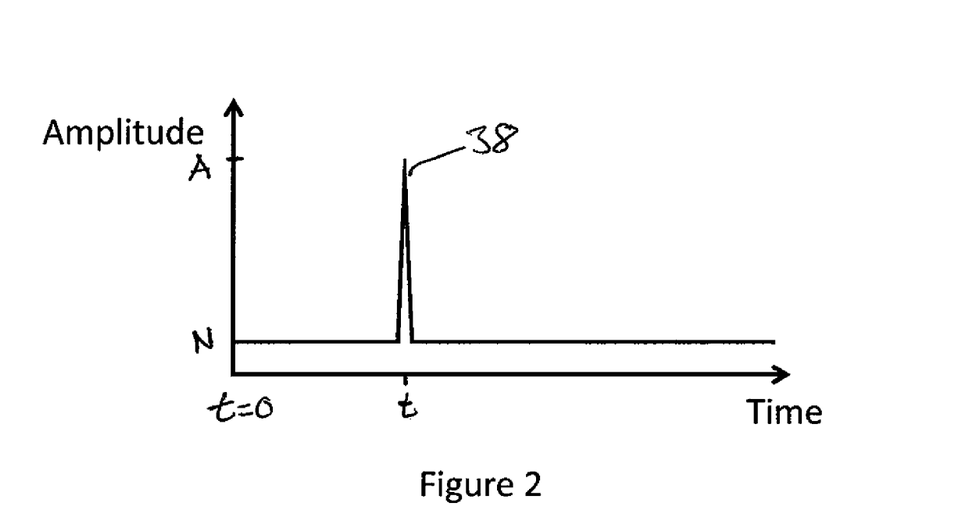
FIG. 2 shows an example signal which may be received by a receiver of ultrasonic testing equipment when applied to the fan blade root of FIG. 1.

An example of a signal corresponding to reflection of the pulse 32 at crack 40 is shown in FIG. 2 which shows the amplitude of an output signal from the receiver against time. The transmitter emits a signal at T=0. The receiver receives a substantially constant level of background noise of amplitude N. At time t, the receiver receives the reflected pulse 34 and the output signal rises to a peak 38 of amplitude A.

If the local speed of sound of the composite material of the root 10 is known, the distance from the inspection surface 20 to the point of reflection can be determined based on the time t. The operator can therefore determine whether the peak 38 relates to the presence of a defect 40 or reflection at an opposing wall, referred to herein as a "back wall echo". An operator may take into account other factors to determine whether the peak 38 relates to a defect or back wall echo, such as changes in the time t as they reposition the testing equipment 30 over the inspection surface, and a change in the amplitude of a peak 38.

The amplitude A of the peak 38 is dependent on several factors including the amplitude of the pulse 32 emitted by the transmitter, the attenuation of the pulse through the composite material (a function of distance and material properties), and the magnitude of the change in the local speed of sound at the boundary. For a larger difference in the local speed of sound at a boundary between two materials, a larger proportion of the pulse would be reflected back.

If a crack or other defect exists relatively deep below the inspection surface 20, a pulse may be attenuated such that it is not detected by the receiver after reflection at the defect. Therefore, the non-detection of a peak 38 by the receiver could be due to either (i) there being no defect in the path of the pulse, or (ii) a defect being too far away from the inspection surface 20 for detection or (iii) equipment failure. Therefore the absence of a detected pulse does not necessarily mean that there is no defect within the root 10. As such, in the absence of a back wall echo being detected at the receiver, an operator may be unable to determine if there is a defect in the path of the pulse or if the equipment is malfunctioning.

Figure 3:
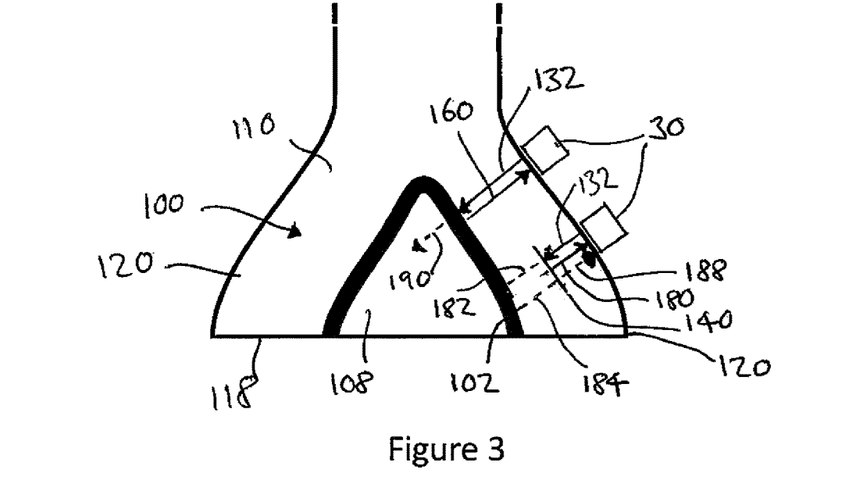
FIG. 3 schematically shows a cross section of an example fan blade root.

FIG. 3 shows a cross section of an example fan blade root 100 comprising an embedded internal reflection boundary 102. The boundary 102 is in the form of a layer of boundary material which is configured to change a velocity of a signal so that it is reflected before it is attenuated to such an extent that it would not be detected. As will be described in detail below, the boundary therefore simulates a back wall echo and may therefore be useful to enable an operator to positively confirm that the equipment is operating correctly and there are no defects in the region outside of the boundary.

In this simplified example the root 100 has a substantially constant axial cross-section and tapers along a radially outward direction, as described above with respect to the root 10 of FIG. 1. The root 100 has a radially inner base surface 118 opposite a blade portion and two tapering side surfaces corresponding to the pressure and suction surfaces of the blade portion. The tapering side surfaces of the root 100 are referred to herein as inspection surfaces 120.

The root 100 comprises an inner region 108 and an outer region 110. In axial cross-section, the outer region 110 extends from the inspection surfaces 120 inwards to surround the inner region 108. The outer region 110 therefore defines the inspection surfaces 120.

The boundary 102 delimits the inner region 108 from the outer region 110. In this example, the boundary separates the outer region 110 from the inner region 108 and is configured so that any pulses emitted at either inspection surface 120 through the outer region 110 are at least partially reflected at the internal reflection boundary 102. The boundary 102 delimits the inner region 108 and the outer region 110 so that any pulses reaching the inner region must be partially transmitted through the boundary layer 102 in order to reach the inner region 108. In other words, the boundary 102 is configured so that no pulse can reach the inner region 108 from the inspection surface 120 without passing through the boundary 102.

The boundary 102 has a different local speed of sound to the material of the outer region 110. In some examples, it may also have a different local speed of sound to the material of the inner region 108. In this example, the inner and outer regions 108, 110 are composed of a carbon fibre composite material and the boundary 102 is composed of a glass fibre composite material. In other examples, the boundary 102 may be composed of a polymer, metal alloy or any other material with good bonding properties with the material of the inner and outer regions 108, 110 (e.g. carbon fibre composite material).

In this example, the boundary 102 is embedded below the inspection surfaces 120 at a substantially constant depth below the inspection surfaces 120, as measured along a direction perpendicular to the respective inspection surface. However, in other examples the boundary 102 may be embedded at a variable depth. The position, curvature and profile of the boundary 102 may be dependent of the local ply structure, which may or may not directly correspond to the curvature and profile of a nearest inspection surface.

The example root 100 comprises a first region having a first stress state that inhibits defect formation, such as crack propagation, and a second region that does not inibit detect formation. Such regions of stress states are readily computable based on the known geometry and material properties of a component together with a operational loading configuration for routine operation. The first region may generally be compressive in nature so as to inhibit detect formation. The second region may have a stress state including tensile and shear stress loading that may not inhibit detect formation (or may promote such formation), such as crack propagation. The first region may therefore be referred to as a compressive stress region and the second region may be referred to as a tensil stress region. In examples described herein, the tensile stress region is located in the outer region 110 and extends from the inspection surface 120 into the outer region 110. The compressive stress region is surrounded by the tensile stress region such that an interface between the compressive stress region and the tensile stress region is located in the outer region 110. The internal reflection boundary 102 is located within the compressive stress region so that the inner region 108 is wholly located in the compressive stress region.

The compressive stress region may be less susceptible to the formation of defects because cracks and other defects tend to form under action of tensile or shear stress.

The internal reflection boundary 102 is provided to simulate a back wall echo so that an operator may positively confirm that there are no defects between the inspection surface 120 and the boundary 102—i.e. in the outer region 110. Accordingly, locating the boundary so that the tensile stress region is wholly located in the outer region ensures that such confirmation is provided for the region where defects are most likely to occur. Further, by locating the boundary 102 in the compressive stress region, any negative impact on the tensile strength of the root 100 owing to the presence of the boundary 102 may be mitigated. In some examples, the presence of the reflection boundary or the structures which define it may reduce a structural resilience of the fan blade relative to a fan blade root of similar construction without the reflection boundary. Accordingly, locating the reflection boundary in a region which is less susceptible to defects or defect propagation may mitigate against any such reduction in structural resilience.

The compressive stress region may be less critical to the structural integrity of the fan blade and may therefore accommodate any negative effect on the strength that may arise by virtue of incorporating the boundary 102.

In use, ultrasonic testing equipment 30 is applied on the inspection surfaces 120 of the root 100 and pulses 132 are transmitted through the outer region 110 of the root 100 as described above. Example signals as may be received by the equipment 30 and displayed for interpretation by an operator are shown in FIGS. 4a and 4b.

Figure 4A:
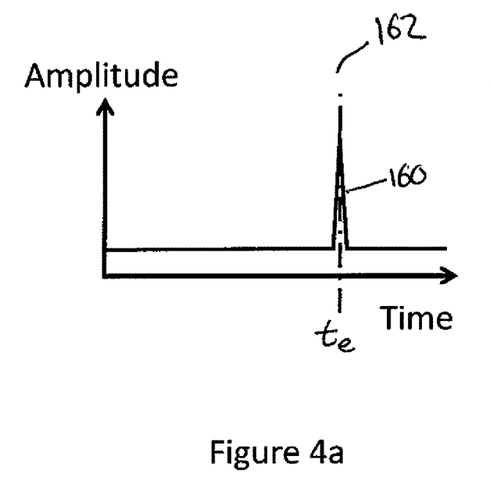
FIGS. 4a and 4b show example signals which may be received by a receiver of ultrasonic testing equipment when applied to the fan blade root of FIG. 3.
Figure 4B:
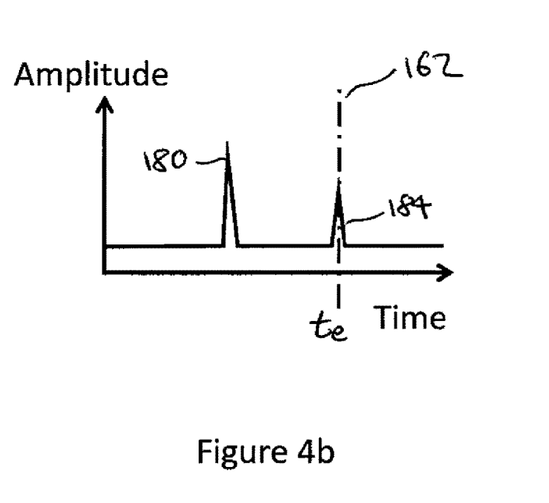

FIG. 4a shows an example signal received by the equipment 30 when there is no defect in the path of the transmitted pulse 132. The pulse 132 is partially reflected at the boundary 102 and the reflected pulse 160 is detected by the equipment 30. Since the depth of the boundary 102 from the contact surface 120 is known and substantially constant around the inspection surface 120, an expected time of detection $t_e$ of the reflected pulse 160 can be calculated. This may be overlaid as a line 162 at $t=t_e$ as shown in FIG. 4a, or may simply be inferred by an operator through use and experience of testing. For example, an operator inspecting the root 100 would observe a consistent reflected pulse at time $t=t_e$ at multiple locations around the inspection surface 120 and conclude that this relates to reflection at the boundary 102.

In an example when the equipment 30 detects a reflected pulse at time $t_e$, and no pulse is detected before this, there is positive confirmation that the equipment is working and that there are no defects in the outer region 110 of the root 100 in the path of the pulse 132. An operator can therefore interpret the signal shown on the display (or an audible equivalent, for example) to verify whether or not a defect has been detected. Such analysis could also be carried out automatically by the equipment without the need for a display.

In an example when a defect 140 exists in the path of the pulse 132, the pulse 132 is partially reflected at the defect 140 and partially transmitted 182 through the defect 140. A reflected pulse 180 is therefore detected at the equipment 30 before the expected time $t_e$. The operator can interpret the displayed signal to determine that there is a defect 140 in the outer region 110 in the path of the pulse.

After being partially transmitted through the defect 140, the pulse 182 may reach the boundary 102 and be reflected back towards the inspection surface 120. However, this reflected pulse 184 may be only partially transmitted through the defect 140 towards the inspection surface 120 so that the pulse 188 which finally reaches the equipment 30 at the expected time $t_e$ is smaller in amplitude than the pulse 160 received when there is no defect 140.

In some examples, the transmitted pulse 182 through the defect 140 may be attenuated by virtue of the defect such that the reflection at the boundary 102 is not detected by the receiver at the expected time $t_e$. Nevertheless, in such examples the reflected pulse 180 from the defect 140 is still detected, and so an operator may still positively confirm whether a defect 140 is present in the outer region 110 and also positively confirm that the equipment 30 is functioning.

The presence of the boundary 102 may result in more accurate and reliable testing of the outer region 110, as will be described in detail below. However, the ability to test for defects within the inner region 108 may be reduced, as the boundary 102 may attenuate any pulse transmitted towards the inner region 108.

Even if there are no defects in the root, the boundary 102 will reflect a proportion of the pulse 132 and only partially transmit the pulse 190 through the boundary 102 and into the inner region 108. The partially transmitted pulse 190 may be weaker as a result, and any pulses reflected at defects within the inner region 108 would travel back towards the boundary 102 and may therefore be subject to further attenuation at the boundary 102. Therefore, the equipment 30 may not detect defects within the inner region 108, or may be less likely to do so owing to the presence of the reflection boundary 102. However, since the inner region 108 is within the compressive region, it may be less important to detect any defects in the inner region 108 than in the outer region 110.

The internal reflection boundary 102 may be provided to ensure that a reflected pulse is always detected by the equipment 30 when used properly. In examples when no reflected pulse is detected by the equipment 30, for example before the expected time $t_e$ due to a defect, and/or at the expected time $t_e$ due to reflection at the boundary 102, it can therefore be determined that the equipment is being used incorrectly or is defective.

Properties of the root, such as porosity and wrinkling, may be determined based on the quality of the received signal.

A high level of porosity may scatter a pulse such that a reflected pulse detected at expected time $t_e$ may be weaker than a baseline (i.e. it may have a lower amplitude than a baseline threshold corresponding to reflection at the boundary of a root 100 having normal porosity). Further, the scattering may result in a level of background noise which is greater than a baseline (i.e. it may have a greater average amplitude than a baseline amplitude of background noise).

A number of weak pulses (i.e. of relatively low amplitude) being reflected early, or a high level of background noise may indicate wrinkling of composite layers or areas of accumulated resin or composite fibres. Accordingly, such signals which have a level of background noise above a baseline or a series of weak reflected pulses before the expected time $t_e$ may indicate a defective root 100, and may warrant further non-destructive testing.

Accordingly, in addition to enabling positive confirmation of a defect-free outer region 110, the boundary 102 may enable an operator or detection equipment to identify defects associated with porosity and/or wrinkling.

Figure 5:
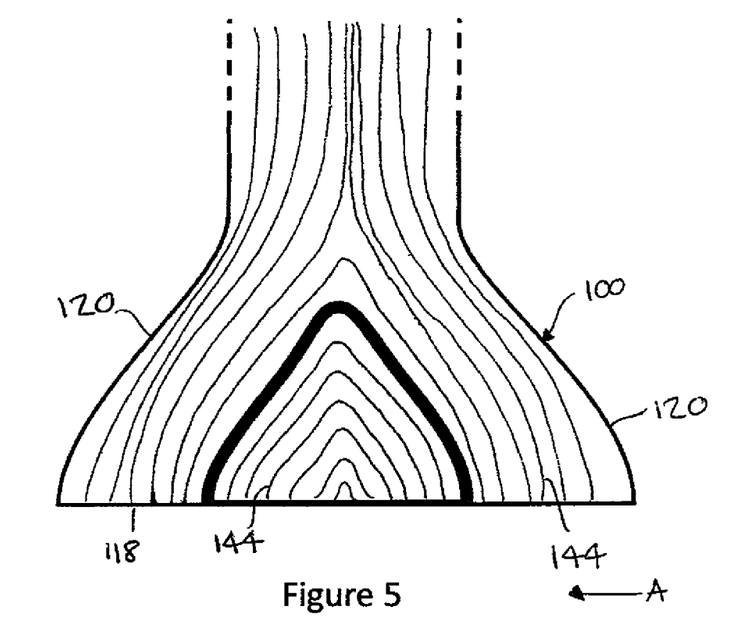
FIGS. 5-7 schematically show cross sections of further example fan blade roots.

FIG. 5 shows a cross section of the fan blade root 100 of FIG. 3 including an example orientation of the plies 144 within the root 100.

In this example, the root 100 is manufactured integrally with the blade portion of the fan blade by laying up composite material in a mould or die for the fan blade to form a pre-form. In this example, a lay-up surface of the mould corresponds to one of the inspection surfaces 120 and the associated side of the blade portion.

In a first lay-up stage, composite material is applied in layers (or plies) 144 along the spanwise length of the blade to form a first part of the outer region 110 (e.g. at one side of the blade). In this example, the composite material is pre-preg carbon fibre. Successive layers are applied along the lay-up direction indicated by the arrow A. Selected plies 144 may be applied solely in the root 100 (rather than along the length of the blade) in order to develop a desired thickness profile of the outer region 110 and the blade portion.

In a second lay-up stage, composite material is applied in layers to form a first part of the boundary 102 separating a first part of the outer region 110 adjacent the lay-up surface from the inner region 108. In this example, the composite material for the boundary 102 is pre-preg glass fibre.

In a third lay-up stage, composite material is applied in layers to form the inner region 108 adjacent the boundary 102. In this example, the composite material is pre-preg carbon fibre.

In a fourth lay-up stage, composite material is applied to form a second part of the boundary 102 separating the inner region from a second part of the outer region 110 farthest from the lay-up surface of the mould. In this example, the composite material for the boundary 102 is once again pre-preg glass fibre.

In a fifth lay-up stage, composite material is applied over the second part of the boundary 102 and along the length of the blade portion, as described above, to form the second part of the outer region 110.

The plies 144 are laid in multiple orientations so as to provide strength along multiple directions in the root 100. Once lay-up is complete, the pre-form is cured to form the fan blade.

As will be appreciated, the shape of the compressive stress region and the tensile stress region depends on the overall geometry and material properties of the fan blade, rather than on the location of a boundary or interface between the inner region 108 and the outer region 110.

Figure 6:
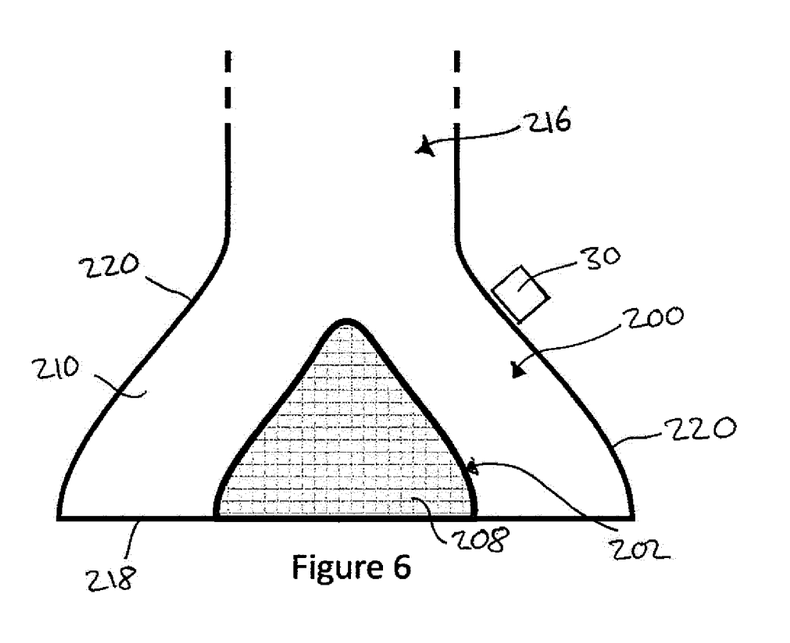

FIG. 6 shows a cross section of a further example of a fan blade root 200.

The fan blade root 200 is defined by a base surface 218 and two inspection surfaces 220 similar to the base and inspections surfaces 118, 220 of the example root 100 described above with respect to FIG. 3. The root 200 tapers from the base surface 218 to a fan blade portion 216.

The root 200 comprises an inner region 208 and an outer region 210. The profile of the inner and outer regions 208, 210 is substantially the same as that described with respect to the fan blade 100 of FIG. 3. The outer region 210 comprises a first material which in this example is a carbon fibre composite material. The inner region 208 has a different local speed of sound to the outer region 210. Therefore, a pulse-reflecting boundary 202 (i.e. a signal-reflecting boundary) exists at the interface between the inner region 208 and the outer region 210. Accordingly, in this example, the boundary 202 is not formed by a discrete material disposed between the inner region 208 and the outer region 210, but rather by the interface between the two regions where there is a difference in the local speed of sound.

In this particular example, the boundary 202 is located at a substantially constant depth from the inspections surfaces 220.

The inner region 208 comprises a second material which in this example is a glass fibre composite material which has a different local speed of sound to the carbon fibre composite material of the outer region 210. Therefore, the different local speed of sound arises because the inner region 208 and the outer region 210 have different materials. In other examples, the inner region 208 could comprise a polymer or metal alloy, for example. In yet further examples, the inner region 208 could use the same material as the outer region 210, but there could be a change in ply orientation at the boundary 202 configured to result in the change in local speed of sound.

In use, the ultrasonic testing equipment 30 is applied on the inspection surface 220 of the root 200 and a pulse is transmitted through the outer region 210. The boundary 202 acts in substantially the same manner as the boundary 102 described above with respect to FIGS. 3 and 4.

Figure 7:
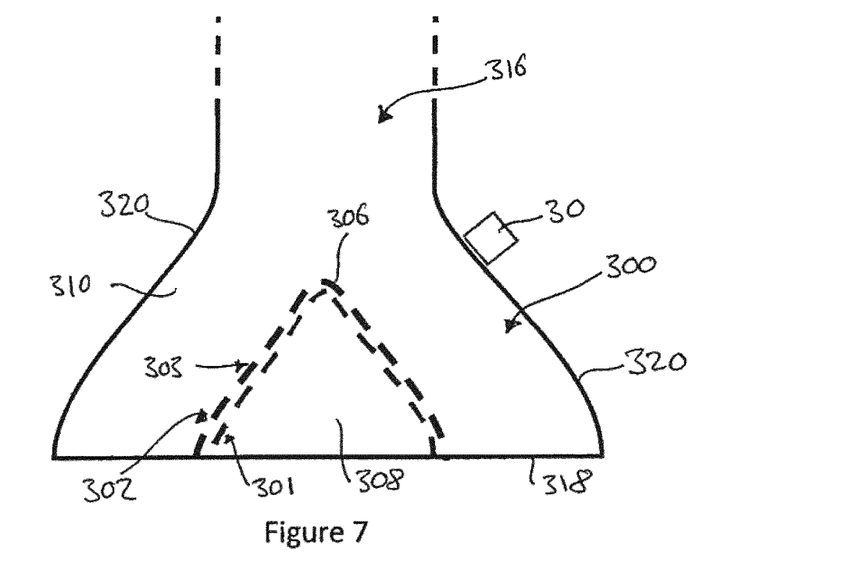

FIG. 7 shows a further example of a composite fan blade root 300.

The fan blade root 300 is defined by a base surface 318 and two inspection surfaces 320 similar to the base and inspection surfaces 118, 220 of the example root 100 described above with respect to FIG. 3. The root 300 tapers from the base surface 318 to a fan blade portion 316.

The root 300 comprises an inner region 308, an outer region 310 and a boundary 302 which separates the outer region 310 from the inner region 308 along directions from the inspection surfaces 320 towards the inner region 308. In particular, the boundary 302 separates the outer region 310 from the inner region 308 in a direction which is substantially perpendicular to the inspection surface 320. The profile of the inner and outer regions 308, 310 is substantially the same as that described with respect to the fan blade 100 of FIG. 3.

The boundary 302 is generally in the form of a layer (which may comprise multiple layers) which is defined by a plurality of discrete portions 306 of boundary material arranged within the layer in a grid or checkerboard arrangement as will be described below. References herein to directions or arrangements "within the layer" are intended to relate to tangential directions within the boundary which may be equivalent to the planar directions in a flattened equivalent of the boundary, or lateral directions in a local tangent plane to the boundary at any point. In particular, adjacent portions 306 of boundary material are offset from one another in a direction normal to the inspection surface 320 such that the boundary 302 has an inner layer 301 (proximal to the inner region 308) and an outer layer 303 (proximal to the outer region 310). The direction normal to the inspection surface 320 at a particular location on the boundary 306 may be the direction normal to the closest part of the inspection surface 320.

In this example, the adjacent portions 306 of boundary material have a quadrilateral shape within the layer and overlap one another in two lateral directions within the layer (i.e. orthogonal directions within a flattened equivalent of the boundary). Accordingly, when viewed from a direction normal to the layer, the adjacent portions 306 of boundary material in this example form a checkerboard pattern over the inner and outer layers 301, 303. In particular, the adjacent portions 306 are distributed across the inner layer 301 and the outer layer 303 in an alternating pattern similar to a checkerboard having two element types, such that the portions 306 of boundary material in the outer layer 303 may correspond to the first element type and the portions 306 of boundary material in the inner layer 301 may correspond to the second element type.

Figure 8A:
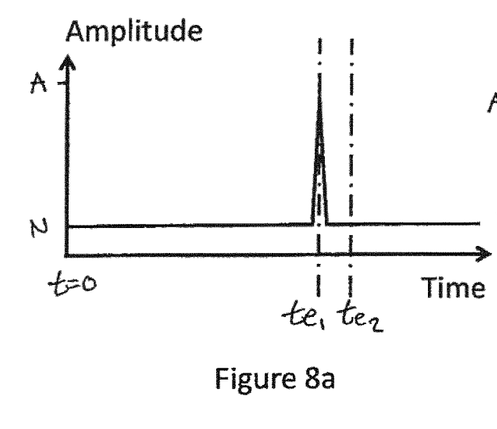
FIGS. 8a and 8b show example signals which may be received by a receiver of ultrasonic testing equipment when applied to the fan blade root of FIG. 7.
Figure 8B:
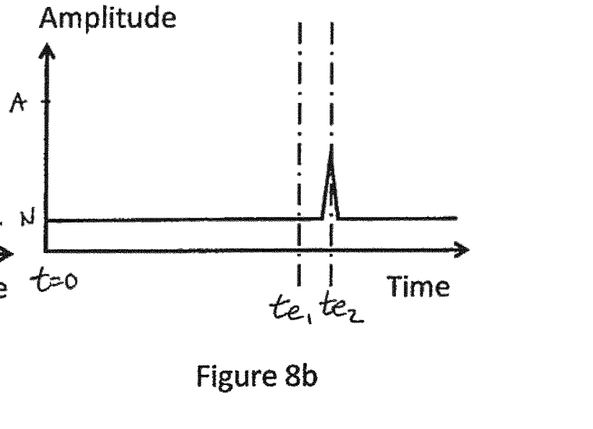

In use, when the equipment 30 is applied on the inspection surfaces 320, there will be two different expected times $t_{e1}$ and $t_{e2}$ for receiving the reflected pulses from the inner boundary layer 301 and the outer boundary layer 303 respectively. As shown in FIGS. 8a and 8b, a line at $t=t_{e1}$ and a further line at $t=t_{e2}$ may be overlaid on the display for an operator. The two expected times may be sufficiently close relative the travel duration of a reflected pulse that an operator may not routinely distinguish between them.

Figure 9:
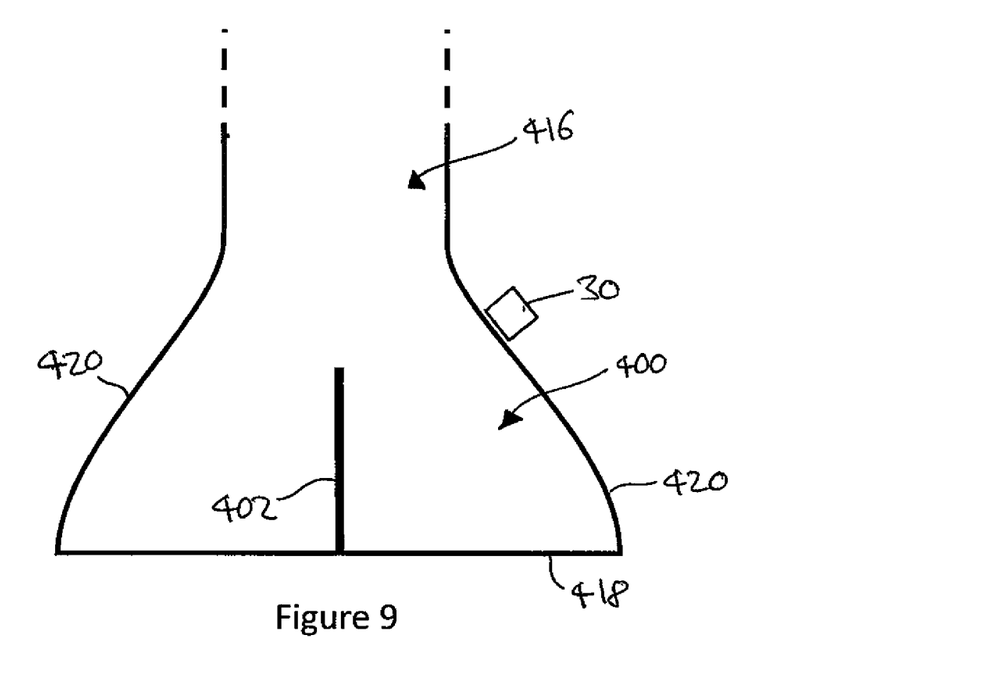
FIGS. 9-11 schematically show cross sections of further example fan blade roots.
Figure 10:
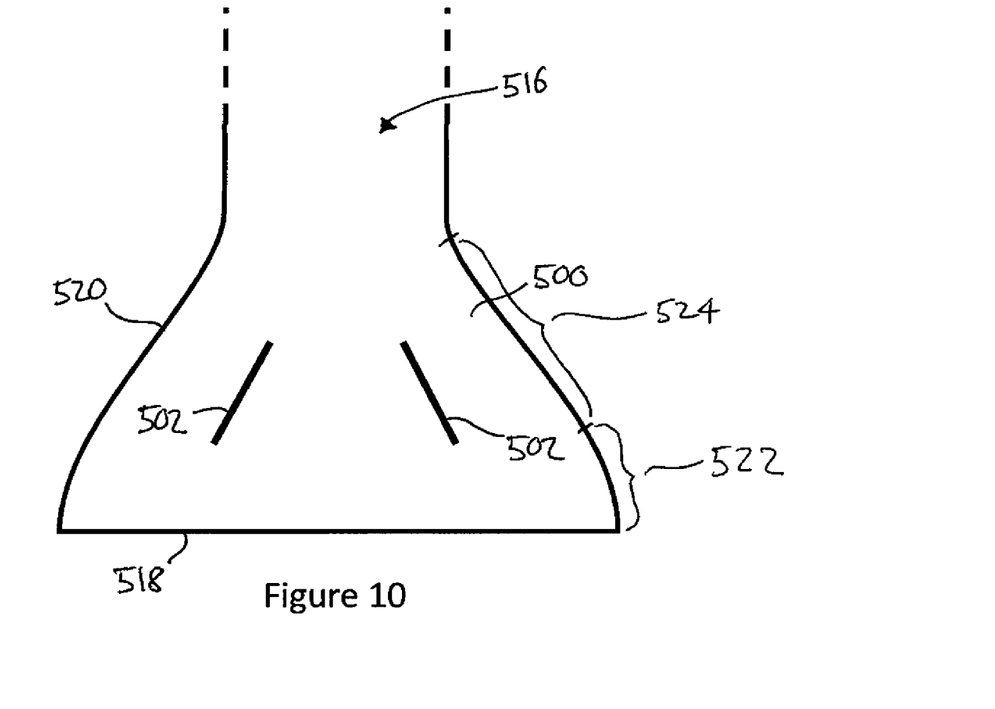

Although examples have been described in which a reflecting boundary is at a substantially constant depth from the inspection surfaces of the respective root, the boundary can be at a varying depth. An operator or equipment may learn or be programmed with a depth profile for the boundary, such that an expected time $t_e$ can be estimated for receiving a reflected pulse from a boundary at any point on an inspection surface. FIGS. 9 and 10 show examples of such boundaries.

FIG. 9 shows a cross section of a further example of a fan blade root 400.

The fan blade root 400 is defined by a base surface 418 and two inspection surfaces 420 similar to the base and inspection surfaces 118, 220 of the example root 100 described above with respect to FIG. 3. The root 400 tapers from the base surface 418 to a fan blade portion 416.

The root 400 also comprises a compressive region and a tensile region as described above.

A boundary 402 is embedded in the root in the form of a planar layer of boundary material extending from the centre of the base surface 418 radially into the root 400. The boundary material is a discrete portion of material that has a different local speed of sound to surrounding composite material of the root 400.

In this example, the boundary 402 is wholly contained within the compressive stress region so that there is no boundary material in the tensile stress region. The boundary 402 is not at a constant minimum distance below the inspection surface 420.

In use, the boundary 402 reflects ultrasound pulses in the same manner as described above with respect to the roots of FIGS. 3, 6 and 7. Despite not delimiting an inner region from an outer region, the presence of the boundary 402 effectively reduces a reflected path length within the root 400, such that a back wall echo can be simulated and detected using inspection equipment 30 as described above.

However, since the depth from the inspection surface 420 to the boundary 402 is not constant, it may be more difficult to distinguish between or infer whether a reflected pulse is indicative of reflection at the boundary 402 or at a defect. An operator or detection equipment may nevertheless be able to make such a distinction. For example, an operator or equipment may know or be programmed with the depth profile of the boundary 402 as correlated to different positions on the inspection surface, such that an expected time for reflection from the boundary may be estimated. Further, as the depth profile may vary gradually, the time for reflection of a pulse at the boundary may vary continuously as the equipment 30 is moved over an inspection surface. Accordingly, an operator or equipment may interrogate reflection results to determine a discontinuous change in the time for reflection of a pulse, as this may be indicative of the presence of a defect away from the boundary 402.

FIG. 10 shows a cross section of a further example of a fan blade root 500.

The fan blade root 500 is defined by a base surface 518 and two inspection surfaces 520 which are similar to the base and inspection surfaces 118, 220 of the example root 100 described above with respect to FIG. 3. The root 500 tapers from the base surface 518 to a fan blade portion 516.

The root 500 comprises two discrete boundaries 502 formed by respective discrete portions of boundary material. Each boundary is associated with a respective one of the inspection surfaces 520 and is embedded within the root 500 below the respective inspection surfaces 520 to reflect ultrasonic pulses as described above with respect to the roots of FIGS. 3 and 6-8.

In this example, the boundaries 502 are provided to reduce the path length of a reflected pulse in the root in the absence of a defect. As will be appreciated, in the absence of the boundaries, the minimum path length of a reflected pulse in the root is variable along the inspection surfaces 520. For example, when the testing equipment is placed on a region of the inspection surface 520 close to the junction with the base surface 518, the minimum path length of a reflected pulse may be relatively short—for example a pulse may be reflected at the base surface 518. When the testing equipment is placed at a point towards the middle of an inspection surface 520 (i.e. between the base and the blade portion 516), the minimum path length of a reflected pulse may be relatively long. For example, the minimum path length may correspond to reflection at the opposing inspection surface 520. Further, when the testing equipment is placed at a point on the inspection surface 520 towards the blade portion 516 at which the thickness of the root 500 is relatively tapered or necked, the minimum path length of a reflected pulse may once again be relatively short.

In this example, each boundary is associated with a respective one of the inspection surfaces 520 and is disposed below the respective inspection surface to reduce the minimum path length of a reflected pulse from those portions of the inspection surfaces 520 where the minimum path length of a reflected pulse would otherwise be greatest.

In the particular example of FIG. 10, the boundaries 502 do not extend to the base surface 518, and are not continuous with each other, and are therefore completely surrounded by the composite material which forms the body of the root, including an outer region which defines the inspection surface 520.

In the example roots 400, 500 described above with respect to FIGS. 9 and 10, points on the inspection surfaces 420, 520 have a minimum reflection path length corresponding to either back wall reflection at an opposing surface of the root 400, 500 (e.g. an opposing inspection surface 420, 520 or the base surface 418, 518) or boundary reflection at the associated boundary 402, 502. In each example, the boundary 402, 502 is positioned within the root 400, 500 so that for points within a first region of the inspection surface (e.g. adjacent the base surface 418, 518 or the blade portion 416, 516 as described above), the minimum reflection path length corresponds to back wall reflection (i.e. at an opposing surface of the root), whereas for points within an intermediate second region of the inspection surface (e.g. along central region of the inspection surface as shown in axial cross section in FIGS. 9 and 10) the minimum reflection path length corresponds to boundary reflection at the respective boundary 402, 502. In FIG. 10, an example first region as described above is indicated with reference numeral 522 towards the base 518, whereas an example second region as described above is indicated with reference numeral 524.

Accordingly, the use of the boundary 402, 502 in these examples has the effect of reducing the minimum reflected path length to below a threshold, where necessary. No boundary may be provided in regions where the minimum reflected path length is already below the threshold.

Put simply, the boundary 402, 502 is provided to simulate a back-wall echo for inspection of the thickest portions of the fan blade root in which pulses may be severely attenuated, and does not extend to the relatively thin regions of the fan blade root.

Figure 11:
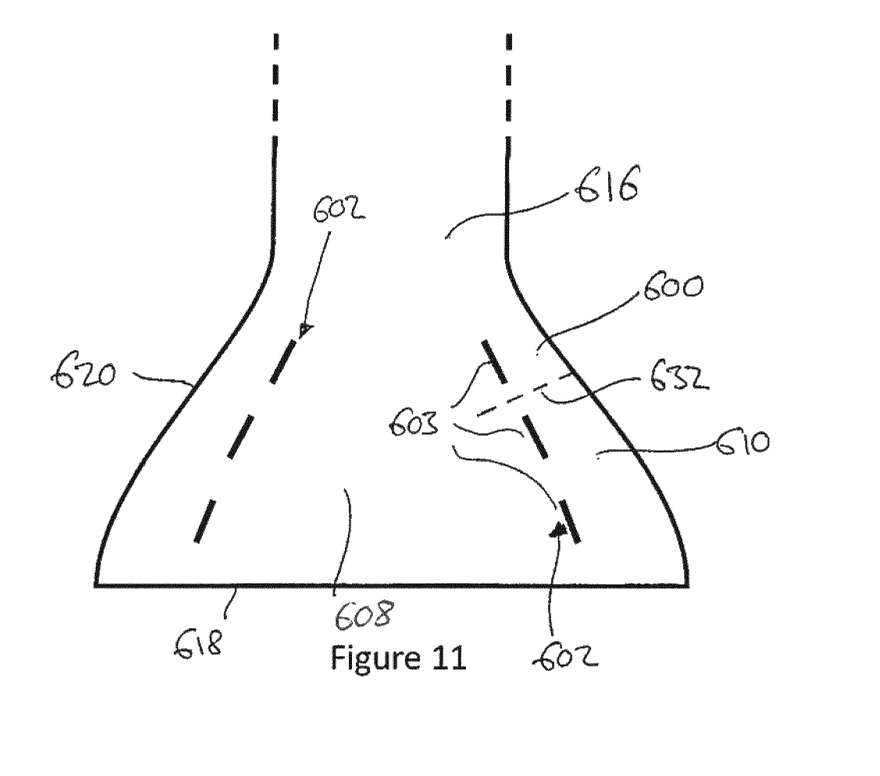

FIG. 11 shows a cross section of a further example of a fan blade root 600.

The fan blade root 600 is defined by a base surface 618 and two inspection surfaces 620 which are similar to the base and inspection surfaces 118, 220 of the example root 100 described above with respect to FIG. 3. The root 600 tapers from the base surface 618 to a fan blade portion 616.

The root 600 comprises two separate boundaries 602 associated with respective inspection surfaces which are each in the form of a layer of boundary material comprising discrete portions of boundary material 603. In other examples the boundaries 602 may be substantially contiguous to define a single boundary. Each boundary is associated with a respective one of the inspection surfaces 620 and is embedded within the root 600 below the respective inspection surfaces 620 to reflect ultrasonic pulses as described above with respect to the roots of FIGS. 3 and 6-8.

In this example the discrete portions of boundary material 603 in each layer or boundary 602 are spaced apart from one another—i.e. along a lateral direction with respect to the layer 602. Accordingly, whilst the boundaries 602 demarcate an outer region 610 of the root 600 from an inner region 608, there may exist a path 632 for a signal from one of the inspection surfaces and through a space between adjacent discrete portions of boundary material 603, such that the path 632 can reach the inner region 608 without passing through any portion of boundary material 603.

The discrete portions of boundary material 603 are spaced apart from one another so that for any point on the inspection surface a path to a closest one of the discrete portions of boundary material is shorter than a path extending from the respective point and through a space between two closest discrete portions of boundary material to an opposing surface of the fan blade root. Therefore, when a signal is emitted from a point on the inspection surface and transmitted through the root in a plurality of directions, a reflected signal would still be reflected from one of the closest portions of boundary material towards the inspection surface so as to simulate back wall echo and confirm proper functioning of the equipment, even if each and every path for a signal does not result in a back-wall echo.

Accordingly, the boundaries 602 each serve to reduce the length of a reflected pathway from the inspection surface in a similar way to the boundaries 402, 502 described above with respect to the roots 400, 500 of FIGS. 9 and 10, despite not wholly enclosing an inner region from an outer region.

Although example fan blade roots have been described in which the axial cross section is substantially constant, it will be appreciated that the axial cross section may vary along the chord of a fan blade. In some examples the cross-sectional shape may be similar along the chordwise extent of the fan blade.

The invention claimed is:

1. A composite fan blade root comprising:
   an outer region comprising composite material and defining an outer inspection surface of the fan blade root; and
   an internal reflection boundary embedded within the fan blade root, the internal reflection boundary being configured to change a velocity of a signal emitted into the fan blade root from the outer inspection surface;
   the fan blade root further comprises an inner region surrounded by the outer region, wherein the internal reflection boundary is in the form of a discontinuous layer of boundary material which delimits the inner region from the outer region and which has different acoustic properties from, and is embedded within, the composite material of the outer region;
   wherein the internal reflection boundary is defined by a plurality of discrete portions of the boundary material.

2. A composite fan blade root according to claim 1, wherein the internal reflection boundary delimits the inner region from the outer region so that any signal emitted through the outer inspection surface and reaching the inner region passes through the internal reflection boundary.

3. A composite fan blade root according to claim 1, wherein the internal reflection boundary is defined by an interface between the outer region and the inner region.

4. A composite fan blade root according to claim 1, wherein the outer region comprises a carbon fibre composite material; and wherein the inner region comprises a glass fibre composite material, polymer or metal alloy.

5. A composite fan blade root according to claim 1, wherein the inner and outer regions comprise the same material.

6. A composite fan blade root according to claim 1, wherein the outer region comprises a first material and the inner region comprises a different second material.

7. A composite fan blade root according to claim 1, wherein a ply structure of the outer region differs from a ply structure of the inner region so that the internal reflection boundary is formed by a change in the ply structure at an interface between the inner region and the outer region.

8. A composite fan blade root according to claim 1, wherein the discrete portions of the boundary material are spaced apart from one another so that for any point on the outer inspection surface, a path to a closest discrete portion of the boundary material is shorter than a path extending between two closest discrete portions of the boundary material to an opposing surface of the fan blade root.

9. A composite fan blade root according to claim 1, wherein adjacent portions of the boundary material are offset from one another in a direction normal to a local tangent plane of the layer, and overlap one another along a lateral direction within the layer.

10. A composite fan blade root according to claim 9, wherein adjacent portions of the boundary material overlap along two orthogonal lateral directions within the layer.

11. A composite fan blade root according to claim 1, wherein the internal reflection boundary is in the form of a layer of boundary material which is completely surrounded by the composite material.

12. A composite fan blade root according to claim 1, wherein for each point on the outer inspection surface there is a minimum reflection path length corresponding to either back wall reflection at an opposing surface of the fan blade root or boundary reflection at the internal reflection boundary; and wherein the internal reflection boundary is positioned so that for points within a first region of the outer inspection surface the minimum reflection path length corresponds to back wall reflection; whereas for points within a second region of the outer inspection surface the minimum reflection path length corresponds to boundary reflection.

13. A composite fan blade root according to claim 1 having a compressive stress region corresponding to compressive loading in use, and wherein the internal reflection boundary is disposed within the compressive stress region.

14. A composite fan blade root according to claim 1, wherein a profile of the internal reflection boundary corresponds to a profile of the outer inspection surface, or the internal reflection boundary is embedded in the fan blade root at a substantially constant depth from the outer inspection surface.

15. A composite fan blade comprising a root in accordance with claim 1.

16. A composite fan blade root comprising:
- an outer region comprising composite material and defining an outer inspection surface of the fan blade root; and
- an internal reflection boundary embedded within the fan blade root, the internal reflection boundary being configured to change a velocity of a signal emitted into the fan blade root from the outer inspection surface;
- wherein the internal reflection boundary is in the form of a discontinuous layer of boundary material which has different acoustic properties from, and is embedded within, the composite material of the outer region;
- wherein adjacent portions of the boundary material are offset from one another in a direction normal to a local tangent plane of the layer and overlap one another along a lateral direction within the layer.

17. A composite fan blade root according to claim 16, wherein adjacent portions of the boundary material overlap along two orthogonal lateral directions within the layer.

* * * * *